United States Patent
Chung

(10) Patent No.: US 12,532,084 B2
(45) Date of Patent: Jan. 20, 2026

(54) IMAGE SENSING DEVICE

(71) Applicant: Novatek Microelectronics Corp., Hsinchu (TW)

(72) Inventor: Jung-Chen Chung, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 319 days.

(21) Appl. No.: 18/167,869

(22) Filed: Feb. 12, 2023

(65) Prior Publication Data

US 2024/0276108 A1 Aug. 15, 2024

(51) Int. Cl.
*H04N 25/42* (2023.01)
*H04N 25/766* (2023.01)
*H04N 25/779* (2023.01)
*H04N 25/78* (2023.01)

(52) U.S. Cl.
CPC ........... *H04N 25/42* (2023.01); *H04N 25/766* (2023.01); *H04N 25/779* (2023.01); *H04N 25/78* (2023.01)

(58) Field of Classification Search
CPC ...... H04N 25/42; H04N 25/779; H04N 25/78; H04N 25/766
See application file for complete search history.

(56) References Cited

U.S. PATENT DOCUMENTS

| 11,555,744 | B2 | 1/2023 | Chan et al. |
| 2015/0281616 | A1 | 10/2015 | Muto et al. |
| 2021/0097318 | A1* | 4/2021 | Chung ............... H04N 25/78 |
| 2021/0102844 | A1 | 4/2021 | Chan et al. |
| 2023/0236067 | A1 | 7/2023 | Chan et al. |

FOREIGN PATENT DOCUMENTS

| EP | 3678366 | 7/2020 |
| TW | 201944080 | 11/2019 |

OTHER PUBLICATIONS

"Notice of allowance of Taiwan Counterpart Application", issued on Jan. 9, 2024, p.1-p. 3.

* cited by examiner

*Primary Examiner* — Lin Ye
*Assistant Examiner* — Fayez A Bhuiyan
(74) *Attorney, Agent, or Firm* — JCIPRNET

(57) ABSTRACT

An image sensing device for sensing an image sensing pixel array through a plurality of sensing lines is provided. The image sensing device includes a first switch, a second switch, a transistor, and a current source. A first terminal of the first switch is coupled to a first sensing line among the sensing lines. A first terminal of the second switch is coupled to a second sensing line among the sensing lines. A first terminal of the transistor is coupled to a second terminal of the first switch and a second terminal of the second switch. The current source is coupled to a second terminal of the transistor.

21 Claims, 11 Drawing Sheets

IMAGE SENSING DEVICE

BACKGROUND

Technical Field

The disclosure relates to an electronic device. In particular, the disclosure relates to an image sensing device.

Description of Related Art

Optical fingerprint identification equipment may sense a fingerprint of a user. When a finger is pressed on a panel, the fingerprint may be imaged by a complementary metal-oxide-semiconductor (CMOS) image sensor under the panel. The CMOS image sensor is typically referred to as CIS (CMOS image sensor). The CMOS image sensor converts analog sensing signals into digital image signals for fingerprint identification in a back-end system.

Generally speaking, an active sensing pixel of the CMOS image sensor is formed by a photo diode and a metal-oxide-semiconductor (MOS) transistor. The image sensing pixel may sense light and convert the light intensity into an electronic signal. Specifically, in the image sensing pixel, a MOS transistor as a source follower (SF) may convert a voltage of the photo diode (as a light sensing result) after the exposure is completed into a sensing voltage. Based on this, an image sensing pixel array of the CMOS image sensor may generate a sensed image (fingerprint image).

Based on the scan timing, the sensing voltages of a plurality of image sensing pixels in different rows may be transmitted to an image readout circuit through the same sensing line at different times. The image readout circuit may sample and hold the sensing voltage on the sensing line. Then, the sampled sensing voltage may be converted into a digital image signal by a front-end amplifier, an analog-to-digital converter, and similar circuits for fingerprint identification in the back-end system.

Linearity of the image sensing pixel is one of the conditions that determines quality of a fingerprint image signal. Generally speaking, nonlinearity is generated by a source follower of the image sensing pixel due to the body effect.

It should be noted that the contents of the section of "Description of Related Art" is used for facilitating the understanding of the disclosure. Part of the contents (or all of the contents) disclosed in the section of "Description of Related Art" may not pertain to the conventional technology known to persons with ordinary skilled in the art. The contents disclosed in the section of "Description of Related Art" do not mean to have been known to persons with ordinary skilled in the art prior to the time of filing this application.

SUMMARY

The disclosure provides an image sensing device to read a sensing result of an image sensing pixel.

In an embodiment of the disclosure, the image sensing device is for sensing an image sensing pixel array through a plurality of sensing lines. The image sensing device includes a first switch, a second switch, a transistor, and a first current source. A first terminal of the first switch is configured to be coupled to a first sensing line among the sensing lines. A first terminal of the second switch is configured to be coupled to a second sensing line among the sensing lines. A first terminal of the transistor is coupled to a second terminal of the first switch and a second terminal of the second switch. The first current source is coupled to a second terminal of the transistor.

In an embodiment of the disclosure, the image sensing device includes an image sensing panel and an image readout integrated circuit (IC). The image sensing panel has a first sensing line, a second sensing line, an image sensing pixel array, a first switch, a second switch, and a transistor. The first sensing line is coupled to a first sensing pixel column of the image sensing pixel array. The second sensing line is coupled to a second sensing pixel column of the image sensing pixel array. A first terminal of the first switch is coupled to the first sensing line. A first terminal of the second switch is coupled to the second sensing line. A second terminal of the first switch and a second terminal of the second switch are coupled to a first terminal of the transistor. The image readout IC has a third switch and an output line. A first terminal of the third switch is coupled to a second terminal and a control terminal of the transistor of the image sensing panel. A second terminal of the third switch is coupled to the output line.

In an embodiment of the disclosure, the image sensing device includes an image sensing panel and an image readout IC. The image sensing panel has an image sensing pixel array, a sensing line, a first switch, a transistor, and a first pad. The sensing line is coupled to a sensing pixel column of the image sensing pixel array. The sensing line is adapted to be coupled to a first current source. A first terminal of the first switch is coupled to the sensing line. A second terminal of the first switch is coupled to a first terminal of the transistor. A second terminal and a control terminal of the transistor are coupled to the first pad. The image readout IC has a second pad and a second current source. The second pad is configured to be coupled to the first pad. The second current source is coupled to the second pad.

Based on the foregoing, the image sensing device according to the embodiments of the disclosure utilizes the transistor and the switch to compensate for nonlinearity and a voltage drop generated by the source follower and the sensing line switch in the image sensing pixel. Therefore, the voltage at the control terminal of the transistor may follow the light sensing result of the light sensing element in the image sensing pixel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
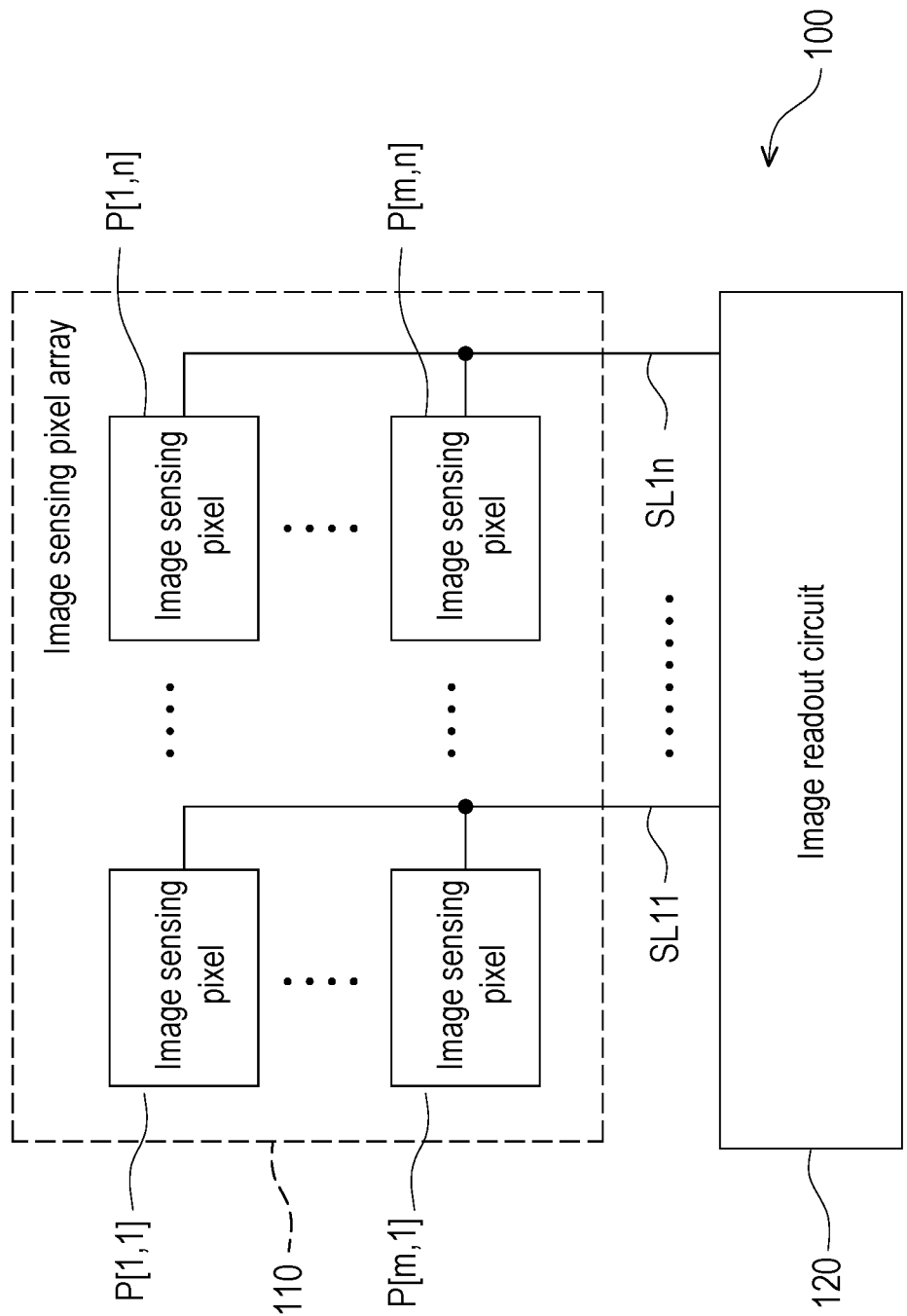
FIG. 1 is a schematic circuit block diagram of an image sensing device according to an embodiment of the disclosure.

The term "coupling (or connection)" as used throughout this specification (including the claims) reference may be made to any direct or indirect means of connection. For example, if it is herein described that a first device is coupled (or connected) to a second device, it should be interpreted that the first device may be directly connected to the second device, or the first device may be indirectly connected to the second device through other devices or some connection means. Terms such as "first" and "second" mentioned through out the description (including the claims) are used to name elements, or to distinguish between different embodiments or scopes, and are not used to limit the upper or lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic circuit block diagram of an image sensing device 100 according to an embodiment of the disclosure. The image sensing device 100 shown in FIG. 1 includes an image sensing pixel array 110 and an image readout circuit 120. Depending on the actual design, in some embodiments, the image sensing device 100 shown in FIG. 1 may be implemented as the same integrated circuit (IC), such as a complementary metal-oxide-semiconductor (CMOS) image sensor. The CMOS image sensor is typically referred to as CIS (CMOS image sensor). In other embodiments, the image sensing pixel array 110 and the image readout circuit 120 shown in FIG. 1 may be implemented as different elements. For example, the image sensing pixel array 110 may be implemented as an image sensing panel (which is integrated with a touch panel and/or a display panel) and the image readout circuit 120 may be implemented as an IC (e.g., a fingerprint, touch and display driver integrated (FTDI) chip). Alternatively, the image sensing pixel array 110 and some circuits/elements of the image readout circuit 120 may be disposed at the image sensing panel, and other circuits/elements of the image readout circuit 120 may be disposed at the IC (e.g., an FTDI chip).

The image sensing pixel array 110 has a plurality of sensing lines, for example, sensing lines SL11, . . . , SL1$n$ shown in FIG. 1. The image sensing pixel array 110 includes a plurality of image sensing pixels, for example, image sensing pixels P[1,1], . . . , P[1,n], . . . , P[m,1], . . . , P[m,n] shown in FIG. 1. Each of the image sensing pixels P[1,1] to P[m,n] may sense light and convert the light intensity into an electronic signal. Each of the sensing lines SL11 to SL1$n$ is electrically connected to a corresponding pixel among the image sensing pixels P[1,1] to P[m,n]. For example, the sensing line SL11 is electrically connected to the image sensing pixels P[1,1] to P[m,1], and the sensing line SL1$n$ is electrically connected to the image sensing pixels P[1,n] to P[m,n]. The image readout circuit 120 may sense the image sensing pixel array 110 through the sensing lines SL11 to SL1$n$. Based on this, the image sensing pixel array 110 may generate a sensed image (e.g., a fingerprint image).

Figure 2:
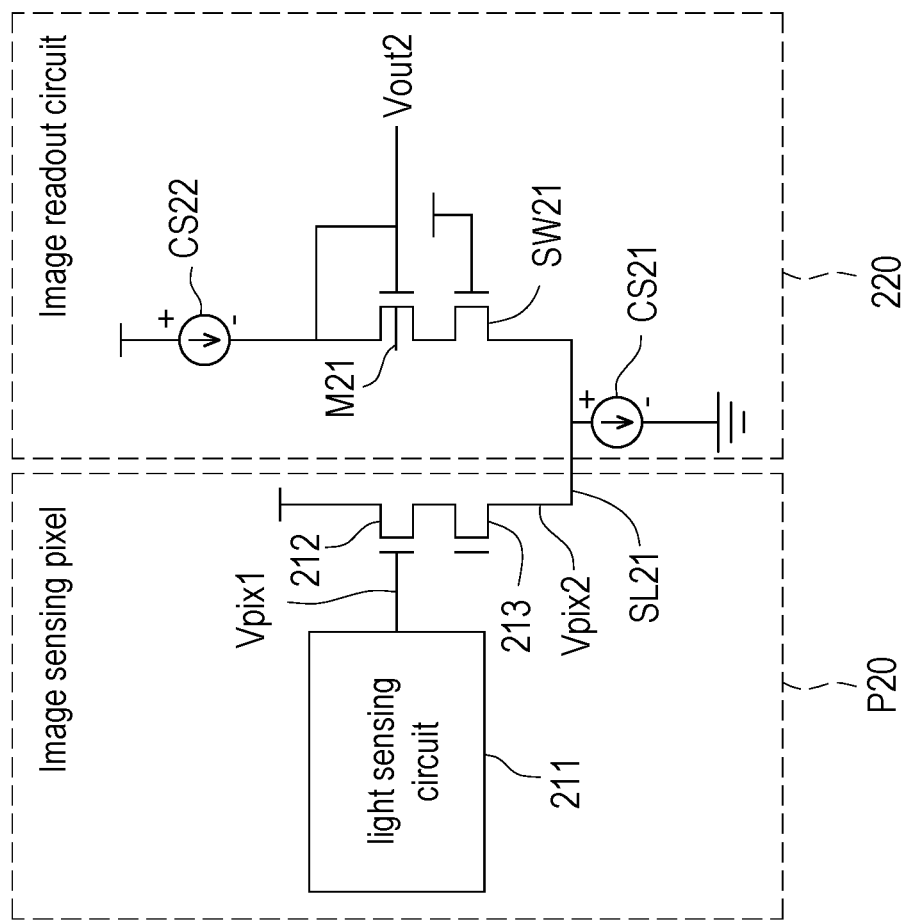
FIG. 2 is a schematic circuit block diagram of an image sensing pixel and an image readout circuit according to an embodiment of the disclosure.

FIG. 2 is a schematic circuit block diagram of an image sensing pixel P20 and an image readout circuit 220 according to an embodiment of the disclosure. The image readout circuit 220 shown in FIG. 2 can be used as one of many examples of the image readout circuit 120 shown in FIG. 1. Reference may be made to the relevant description of the image sensing pixel P20 shown in FIG. 2 for analogy to any one of the image sensing pixels P[1,1] to P[m,n] shown in FIG. 1. In the embodiment shown in FIG. 2, the image sensing pixel P20 includes a light sensing circuit 211, a transistor 212, and a transistor 213. This embodiment does not limit the implementation details of the light sensing circuit 211. Depending on the actual design, the light sensing circuit 211 may include a well-known light sensing circuit or other light sensing circuits. Generally speaking, the light sensing circuit 211 includes a light sensing element (not shown), such as a photo diode or the like. Depending on the actual design, the light sensing circuit 211 may also include a reset switch (not shown) and/or other elements. The light sensing circuit 211 may output a light sensing result of the light sensing element (a sensing voltage Vpix1).

Depending on the actual design, the transistor 212 as a source follower (SF) and/or the transistor 213 as a switch may be any type of transistors. For example, regarding to a CIS, the transistor 212 and/or the transistor 213 may be metal-oxide-semiconductor (MOS) transistors; or, regarding to a fingerprint image sensing panel integrated with a touch display panel, the transistor 212 and/or the transistor 213 may be thin-film transistors. A control terminal of the transistor 212 is coupled to the light sensing circuit 211 to receive the sensing voltage Vpix1. A drain of the transistor 213 is coupled to a source of the transistor 212. A source of the transistor 213 is coupled to the sensing line SL21. Reference may be made to the relevant description of the sensing line SL21 shown in FIG. 2 for analogy to any one of the sensing lines SL11 to SL1$n$ shown in FIG. 1.

Based on the scan timing of the image sensing pixel array 110 (e.g., row-by-row scan), the transistor 213 is turned on during a specified period and turned off during other times. A current source CS21 of the image readout circuit 220 may draw current from a sensing line SL21. When the transistor 213 is turned on, the transistors 212 and 213 may convert the sensing voltage Vpix1 of the light sensing circuit 211 into a sensing voltage Vpix2, and transmit the sensing voltage Vpix2 to the image readout circuit 220 through the sensing line SL21 during the corresponding time. Ideally, the sensing voltage Vpix1 and the sensing voltage Vpix2 should have a linear relationship. Practically, however, nonlinearity is generated by the source follower of the image sensing pixel P20 due to the body effect, resulting in a non-linear relationship between the sensing voltage Vpix1 and the sensing voltage Vpix2. How to compensate for nonlinearity generated by a source follower of an image sensing pixel is one of the issues to be solved by the present disclosure.

The image readout circuit 220 may compensate for nonlinearity generated by the source follower of the image sensing pixel P20. In the embodiment shown in FIG. 2, the image readout circuit 220 further includes a current source CS22, a transistor M21, and a switch SW21. A first terminal of the switch SW21 is coupled to the sensing line SL21. In some embodiments, the size of the transistor M21 may be similar to or the same as the size of the transistor 212, the size of the switch SW21 may be similar to or the same as the size of the transistor 213, and nonlinearity at the transistor M21 is similar to or the same as nonlinearity at the transistor 212. The switch SW21 may be maintained on. When the transistor 213 is turned on, the ON resistance of the transistor 213 may be similar to or the same as the ON resistance of the switch SW21. A first terminal (e.g., a source) of the transistor M21 is coupled to a second terminal of the switch SW21. The current source CS22 is coupled to a second terminal (e.g., a drain) and a control terminal (e.g., a gate) of the transistor M21. For the convenience of description, it is herein assumed that the current drawn by the current source CS21 is twice the output current of the current source CS22. Therefore, the current value on the path of "the transistor M21 and the switch SW21" may be similar to or the same as the current value on the path of "the transistor 212 and the transistor 213". Therefore, a voltage drop on the path of "the transistor M21 and the switch SW21" follows a voltage drop on the path of "the transistor 212 and the transistor 213". An output voltage Vout2 at the second terminal (the control terminal) of the transistor M21 is a compensated voltage generated by compensating the sensing voltage Vpix2. Based on this, the output voltage Vout2 has a linear relationship with the sensing voltage Vpix1.

Other circuits (not shown; e.g., a front-end amplifier, an analog-to-digital converter, and the like) in the image readout circuit 220 may sample and hold the output voltage Vout2 and perform other signal processing operations on the output voltage Vout2. Therefore, the image readout circuit 220 may output a digital image signal corresponding to the sensing voltage Vpix1 to a back-end system (not shown) for application operations (e.g., fingerprint identification).

Figure 3:
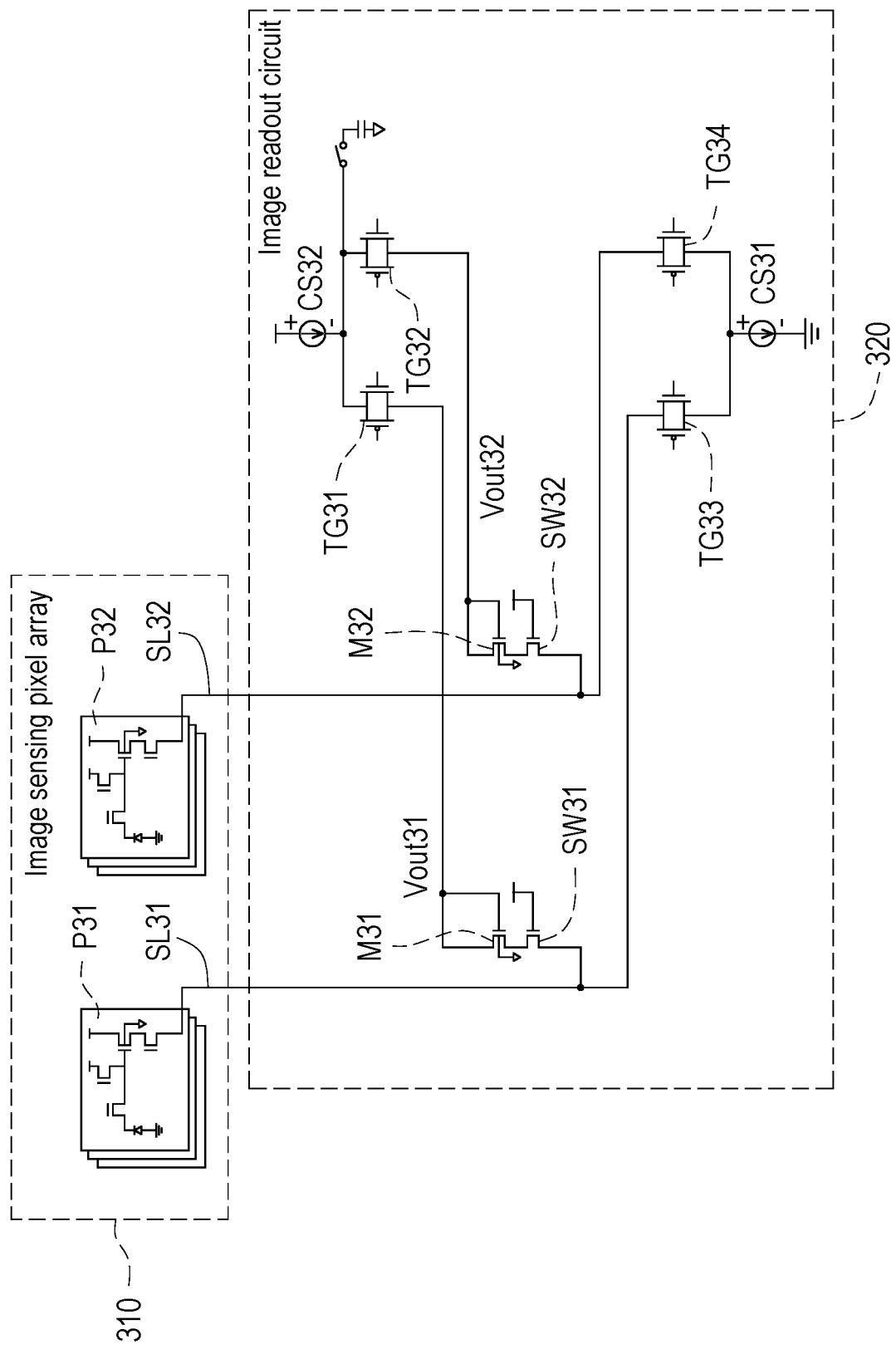
FIG. 3 is a schematic circuit block diagram of an image readout circuit according to another embodiment of the disclosure.

FIG. 3 is a schematic circuit block diagram of an image readout circuit 320 according to another embodiment of the disclosure. The image sensing pixel array 310 shown in FIG. 3 can be used as one of many examples of the image sensing pixel array 110 shown in FIG. 1. The image readout circuit 320 shown in FIG. 3 can be used as one of many examples of the image readout circuit 120 shown in FIG. 1. Reference may be made to the relevant description of the image sensing pixel array 110 and the image readout circuit 120 shown in FIG. 1 for the image sensing pixel array 310 and the image readout circuit 320 shown in FIG. 3. Reference may be made to the relevant description of the sensing lines SL11 to SL1n shown in FIG. 1 and the sensing line SL21 shown in FIG. 2 for sensing lines SL31 and SL32 shown in FIG. 3. Reference may be made to the relevant description of image sensing pixels in different columns in the image sensing pixel array 110 shown in FIG. 1 for image sensing pixels P31 and P32 shown in FIG. 3. For example (but not limited thereto), the sensing line SL31 is coupled to an odd-numbered sensing pixel column of the image sensing pixel array 110 and the sensing line SL32 is coupled to an even-numbered sensing pixel column of the image sensing pixel array 110. Reference may be made to the relevant description of the image sensing pixel P20 shown in FIG. 2 for analogy to the image sensing pixels P31 and P32 shown in FIG. 3, which will therefore not be repeatedly described.

In the embodiment shown in FIG. 3, the image readout circuit 320 includes a current source CS31, a current source CS32, a transistor M31, a transistor M32, a switch SW31, a switch SW32, a transmission gate TG31, a transmission gate TG32, a transmission gate TG33, and a transmission gate TG34. First terminals of the transmission gate TG31 and the transmission gate TG32 are coupled to the current source CS32. The transmission gate TG32 is turned off when the transmission gate TG31 is turned on. On the contrary, the transmission gate TG32 is turned on when the transmission gate TG31 is turned off. A first terminal of the transmission gate TG33 is coupled to the sensing line SL31, and a first terminal of the transmission gate TG34 is coupled to the sensing line SL32. Second terminals of the transmission gate TG33 and the transmission gate TG34 are coupled to the current source CS31. The transmission gate TG34 is turned off when the transmission gate TG33 is turned on. On the contrary, the transmission gate TG34 is turned on when the transmission gate TG33 is turned off.

A first terminal of the switch SW31 is coupled to the sensing line SL31. A first terminal (e.g., a source) of the transistor M31 is coupled to a second terminal of the switch SW31. A second terminal (e.g., a drain) and a control terminal (e.g., a gate) of the transistor M31 are coupled to a second terminal of the transmission gate TG31. When the transmission gate TG31 and the transmission gate TG33 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P31, the sensing line SL31, the current source CS32, the transistor M31, the switch SW31, and the current source CS31 shown in FIG. 3, which will therefore not be repeatedly described. Therefore, an output voltage Vout31 at the second terminal of the transistor M31 is a compensated voltage. Based on this, the output voltage Vout31 has a linear relationship with a sensing voltage of the image sensing pixel P31.

A first terminal of the switch SW32 is coupled to the sensing line SL32. A first terminal (e.g., a source) of the transistor M32 is coupled to a second terminal of the switch SW32. A second terminal (e.g., a drain) and a control terminal (e.g., a gate) of the transistor M32 are coupled to a second terminal of the transmission gate TG32. When the transmission gate TG32 and the transmission gate TG34 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P32, the sensing line SL32, the current source CS32, the transistor M32, the switch SW32, and the current source CS31 shown in FIG. 3, which will therefore not be repeatedly described. Therefore, an output voltage Vout32 at the second terminal of the transistor M32 is a compensated voltage. Based on this, the output voltage Vout32 has a linear relationship with a sensing voltage of the image sensing pixel P32.

Figure 4:
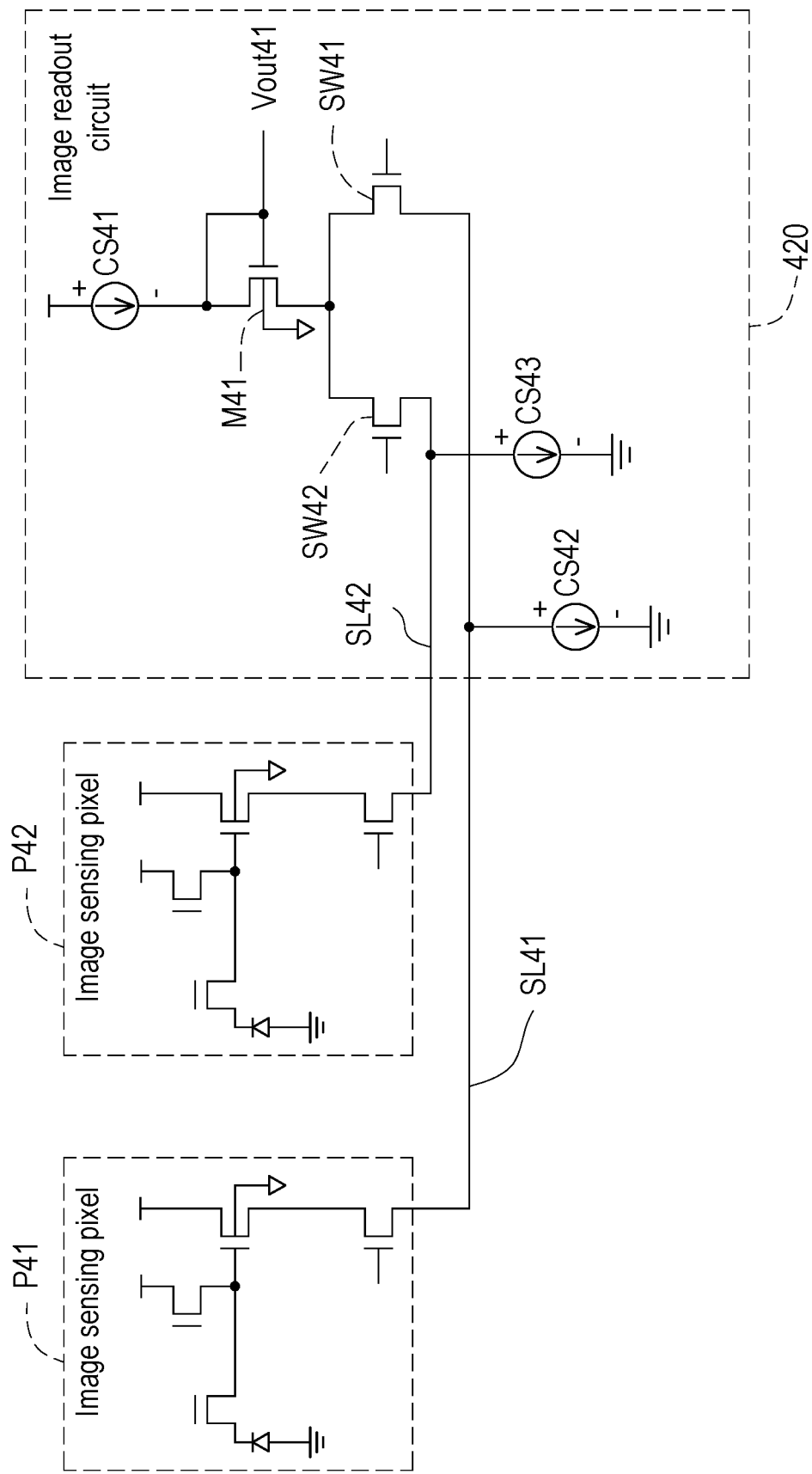
FIG. 4 is a schematic circuit block diagram of an image readout circuit according to another embodiment of the disclosure.

FIG. 4 is a schematic circuit block diagram of an image readout circuit 420 according to another embodiment of the disclosure. The image readout circuit 420 shown in FIG. 4 can be used as one of many examples of the image readout circuit 120 shown in FIG. 1. Reference may be made to the relevant description of the image readout circuit 120 shown in FIG. 1 for the image readout circuit 420 shown in FIG. 4. Reference may be made to the relevant description of the sensing lines SL11 to SL1n shown in FIG. 1 and the sensing line SL21 shown in FIG. 2 for sensing lines SL41 and SL42 shown in FIG. 4. For example (but not limited thereto), the sensing line SL41 is coupled to an odd-numbered sensing pixel column of the image sensing pixel array and the sensing line SL42 is coupled to an even-numbered sensing pixel column of the image sensing pixel array. Reference may be made to the relevant description of the image sensing pixels P[1,1] to P[m,n] in the image sensing pixel array 110 shown in FIG. 1 for the image sensing pixels P41 and P42 shown in FIG. 4. Reference may be made to the relevant description of the image sensing pixel P20 shown in FIG. 2 for analogy to the image sensing pixels P41 and P42 shown in FIG. 4, which will therefore not be repeatedly described.

In the embodiment shown in FIG. 4, the image readout circuit 420 (the image sensing device) includes a current source CS41, a transistor M41, a switch SW41, a switch SW42, a current source CS42, and a current source CS43. The current source CS42 is coupled to the sensing line SL41. The current source CS43 is coupled to the sensing line SL42. A first terminal of the switch SW41 is coupled to the sensing line SL41. A first terminal of the switch SW42 is coupled to the sensing line SL42. A first terminal (e.g., a source) of the transistor M41 is coupled to a second terminal of the switch SW41 and a second terminal of the switch SW42. A current source is coupled to a second terminal (e.g., a drain) of the transistor M41. A control terminal (e.g., a gate) of the transistor M41 is coupled to the second terminal of the transistor M41.

During a period where the image sensing device reads out a sensing signal corresponding to the sensing line SL41, the switch SW41 is maintained on and the switch SW42 is maintained off. For example, the switch SW41 is turned on and the switch SW42 is turned off when the image sensing pixel P41 is turned on and the image sensing pixel P42 is turned off. When the image sensing pixel P41 and the switch SW41 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P41, the sensing line SL41, the current source CS41, the transistor M41, the switch SW41, and the current source CS42 show in FIG. 4, which will therefore not be repeatedly described. At this time, an output voltage Vout41 at the second terminal of the transistor M41 is a compensated voltage of the image sensing pixel P41. Based on this, the output voltage Vout41 has a linear relationship with a sensing voltage of the image sensing pixel P41.

On the contrary, during a period where the image sensing device reads out a sensing signal corresponding to the sensing line SL42, the switch SW42 is maintained on and the switch SW41 is maintained off. For example, the switch SW41 is turned off and the switch SW42 is turned on when the image sensing pixel P41 is turned off and the image sensing pixel P42 is turned on. When the image sensing pixel P42 and the switch SW42 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P42, the sensing line SL42, the current source CS41, the transistor M41, the switch SW42, and the current source CS43 shown in FIG. 4, which will therefore not be repeatedly described. At this time, the output voltage Vout41 of the transistor M41 is a compensated voltage of the image sensing pixel P42. Based on this, the output voltage Vout41 has a linear relationship with a sensing voltage of the image sensing pixel P42.

Figure 5:
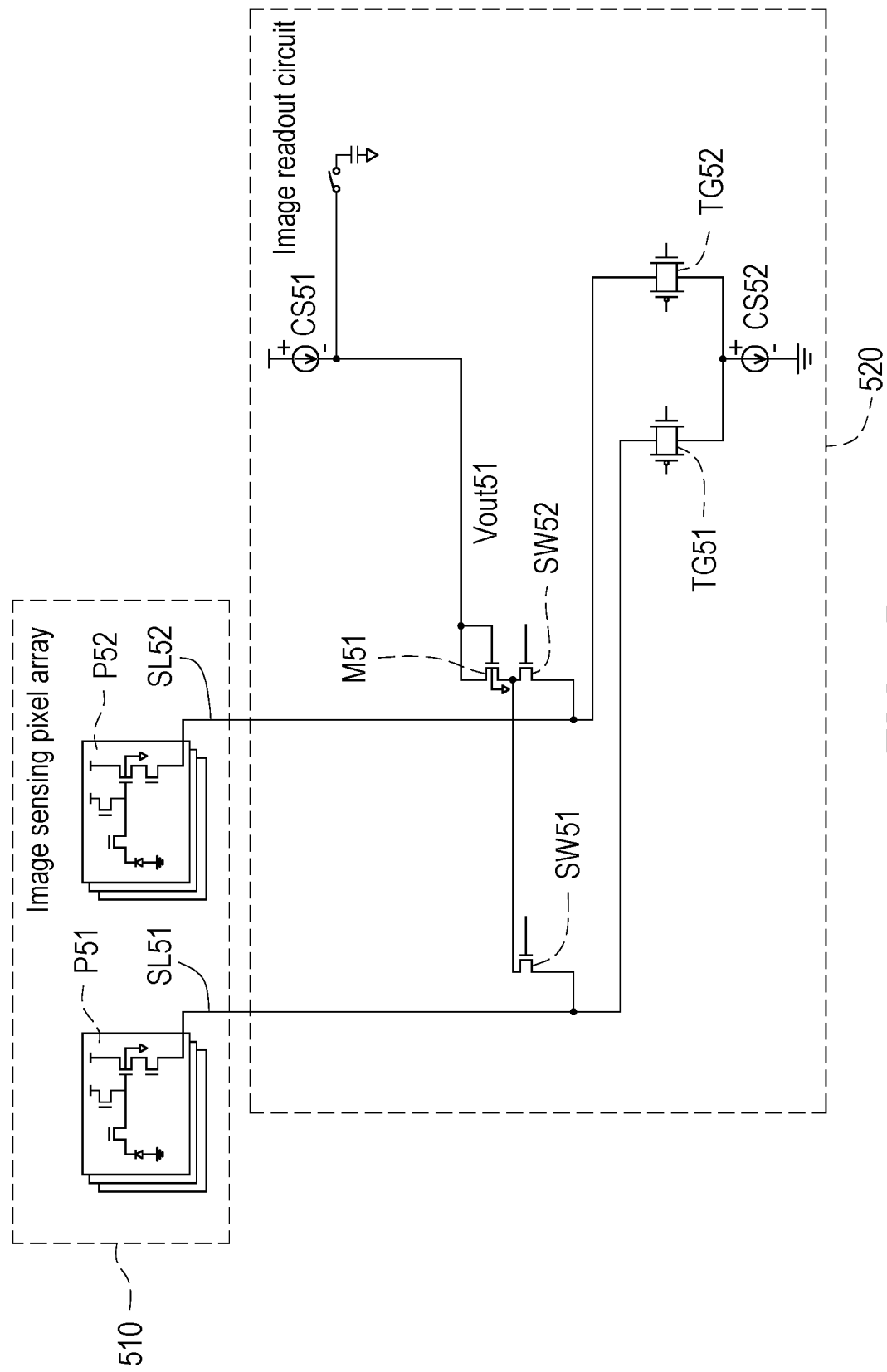
FIG. 5 is a schematic circuit block diagram of an image readout circuit according to another embodiment of the disclosure.

FIG. 5 is a schematic circuit block diagram of an image readout circuit 520 according to another embodiment of the disclosure. The image sensing pixel array 510 shown in FIG. 5 can be used as one of many examples of the image sensing pixel array 110 shown in FIG. 1. The image readout circuit 520 shown in FIG. 5 can be used as one of many examples of the image readout circuit 120 shown in FIG. 1. Reference may be made to the relevant description of the image readout circuit 120 shown in FIG. 1 for the image readout circuit 520 shown in FIG. 5. Reference may be made to the relevant description of the sensing lines SL11 to SL1n shown in FIG. 1 and the sensing line SL21 shown in FIG. 2 for sensing lines SL51 and SL52 shown in FIG. 5. Reference may be made to the relevant description of a column of image sensing pixels in the image sensing pixel array 110 shown in FIG. 1 for an image sensing pixel P51 shown in FIG. 5. Reference may be made to the relevant description of another column of image sensing pixels in the image sensing pixel array 110 shown in FIG. 1 for an image sensing pixel P52 shown in FIG. 5. For example (but not limited thereto), the sensing line SL51 is coupled to an odd-numbered sensing pixel column of the image sensing pixel array 510 and the sensing line SL52 is coupled to an even-numbered sensing pixel column of the image sensing pixel array 510. Reference may be made to the relevant description of the image sensing pixel P20 shown in FIG. 2 for analogy to the image sensing pixels P51 and P52 shown in FIG. 5, which will therefore not be repeatedly described.

In the embodiment shown in FIG. 5, the image readout circuit 520 (the image sensing device) includes a current source CS51, a transistor M51, a switch SW51, a switch SW52, a switch (e.g., a transmission gate) TG51, a switch (e.g., a transmission gate) TG52, and a current source CS52. A first terminal of the switch TG51 is coupled to the sensing line SL51. A first terminal of the switch TG52 is coupled to the sensing line SL52. Second terminals of the switch TG51 and the switch TG52 are coupled to the current source CS52. A first terminal of the switch SW51 is coupled to the sensing line SL51. A first terminal of the switch SW52 is coupled to the sensing line SL52. A first terminal (e.g., a source) of the transistor M51 is coupled to second terminals of the switches SW51 and SW52. A second terminal (e.g., a drain) and a control terminal (e.g., a gate) of the transistor M51 are coupled to the current source CS51.

During a period where the image sensing device reads out a sensing signal corresponding to the sensing line SL51, the switch SW51 is maintained on and the switch SW52 is maintained off. For example, the switch SW51 and the switch TG51 are turned on and the switch SW52 and the switch TG52 are turned off when the image sensing pixel P51 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P51, the sensing line SL51, the current source CS51, the transistor M51, the switch SW51, and the current source CS52 shown in FIG. 5, which will therefore not be repeatedly described. Therefore, an output voltage Vout51 at the second terminal of the transistor M51 is a compensated voltage of the image sensing pixel P51. Based on this, the output voltage Vout51 has a linear relationship with a sensing voltage of the image sensing pixel P51.

During a period where the image sensing device reads out a sensing signal corresponding to the sensing line SL52, the switch SW52 is maintained on and the switch SW51 is maintained off. For example, the switch SW51 and the switch TG51 are turned off and the switch SW52 and the switch TG52 are turned on when the image sensing pixel P52 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P52, the sensing line SL52, the current source CS51, the transistor M51, the switch SW52, and the current source CS52 shown in FIG. 5, which will therefore not be repeatedly described. Therefore, the output voltage Vout51 at the second terminal of the transistor M51 is a compensated voltage of the image sensing pixel P52. Based on this, the output voltage Vout51 has a linear relationship with a sensing voltage of the image sensing pixel P52.

Depending on the actual design, in some embodiments, the image sensing pixel array 510 and the image readout circuit 520 shown in FIG. 5 may be implemented as the same IC, such as a CMOS image sensor (CIS). In other embodiments, the image sensing pixel array 510 and the image readout circuit 520 shown in FIG. 5 may be implemented as different elements. For example, the image sensing pixel array 510 may be implemented as a fingerprint image sensing panel integrated with a touch panel and/or a display panel and the image readout circuit 520 may be implemented as an IC (e.g., an FTDI chip). Alternatively, in some embodiments, the image sensing pixel array 510, the transistor M51, the switch SW51, and the switch SW52 may be disposed in the same image sensing panel, and the current source CS51, the switch TG51, the switch TG52, and the current source CS52 may be disposed in the same image readout IC (e.g., an FTDI chip).

Figure 6:
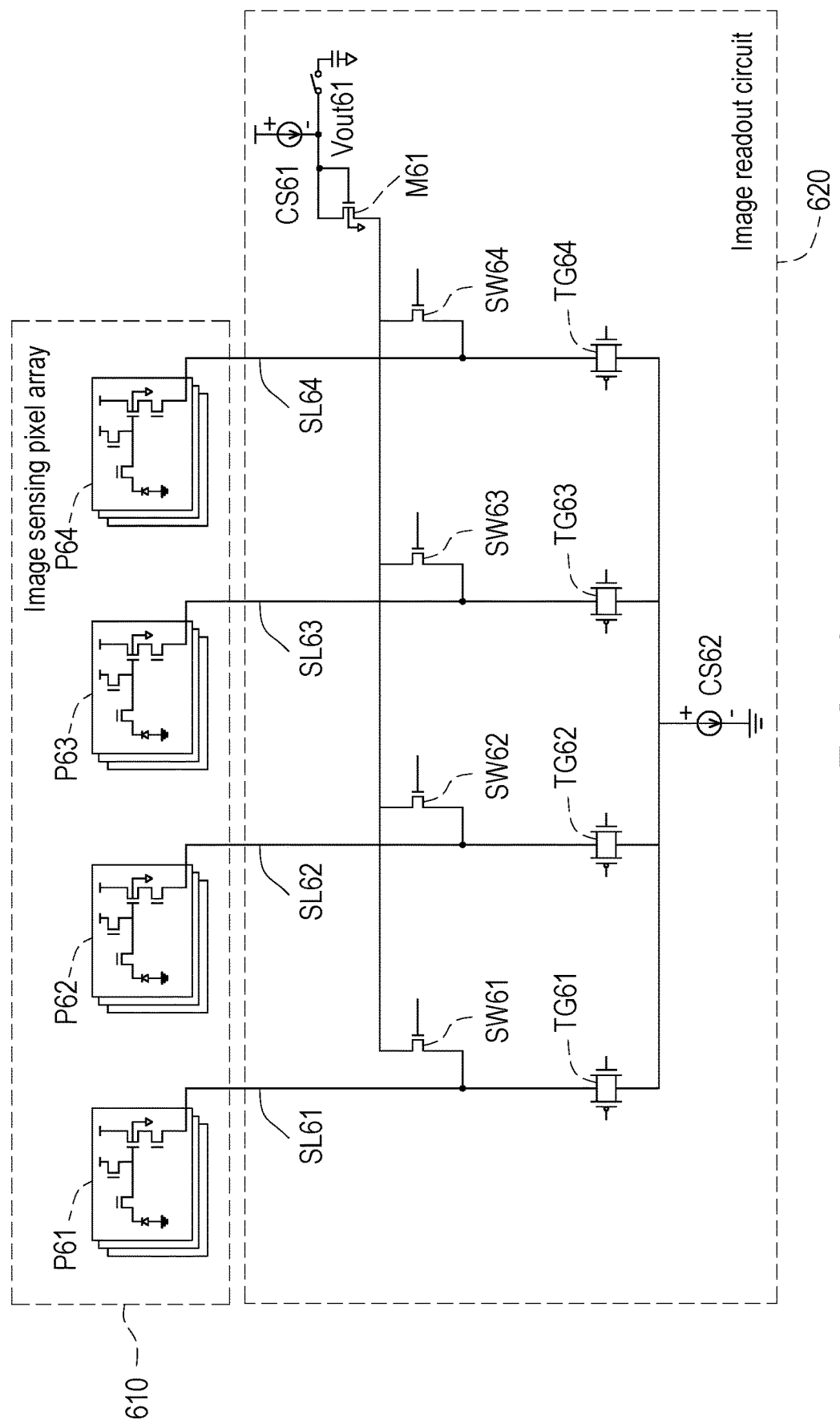
FIG. 6 is a schematic circuit block diagram of an image readout circuit according to another embodiment of the disclosure.

FIG. 6 is a schematic circuit block diagram of an image readout circuit 620 according to another embodiment of the disclosure. The image sensing pixel array 610 shown in FIG. 6 can be used as one of many examples of the image sensing pixel array 110 shown in FIG. 1. The image readout circuit 620 shown in FIG. 6 can be used as one of many examples of the image readout circuit 120 shown in FIG. 1. Reference may be made to the relevant description of the image readout circuit 120 shown in FIG. 1 for the image readout circuit 620 shown in FIG. 6. Reference may be made to the relevant description of the sensing lines SL11 to SL1n shown in FIG. 1 and the sensing line SL21 shown in FIG. 2 for sensing lines SL61, SL62, SL63, and SL64 shown in FIG. 6. Reference may be made to the relevant description of different columns of image sensing pixels in the image sensing pixel array 110 shown in FIG. 1 for each of image sensing pixels P61, P62, P63, and P64 which are in different columns shown in FIG. 6. For example (but not limited thereto), the sensing line SL61 is coupled to a first sensing pixel column of the image sensing pixel array 610, the sensing line SL62 is coupled to a second sensing pixel column of the image sensing pixel array 610, the sensing line SL63 is coupled to a third sensing pixel column of the image sensing pixel array 610, and the sensing line SL64 is coupled to a fourth sensing pixel column of the image sensing pixel array 610. Reference may be made to the relevant description of the image sensing pixel P20 shown in FIG. 2 for analogy to the image sensing pixels P61, P62, P63, and P64 shown in FIG. 6, which will therefore not be repeatedly described.

In the embodiment shown in FIG. 6, the image readout circuit (the image sensing device) 620 includes a current source CS61, a transistor M61, a switch SW61, a switch SW62, a switch SW63, a switch SW64, a switch (e.g., a transmission gate) TG61, a switch (e.g., a transmission gate) TG62, a switch (e.g., a transmission gate) TG63, a switch (e.g., a transmission gate) TG64, and a current source CS62. A first terminal of the switch TG61 and a first terminal of the switch SW61 are coupled to the sensing line SL61. A first terminal of the switch TG62 and a first terminal of the switch SW62 are coupled to the sensing line SL62. A first terminal of the switch TG63 and a first terminal of the switch SW63 are coupled to the sensing line SL63. A first terminal of the switch TG64 and a first terminal of the switch SW64 are coupled to the sensing line SL64. Second terminals of the switches TG61, TG62, TG63, and TG64 are coupled to the current source CS62. A first terminal (e.g., a source) of the transistor M61 is coupled to second terminals of the switches SW61, SW62, SW63, and SW64. A second terminal (e.g., a drain) and a control terminal (e.g., a gate) of the transistor M61 are coupled to the current source CS61.

During a period where the image sensing device reads out a sensing signal corresponding to the sensing line SL61, the switch SW61 and the switch TG61 are maintained on and the switches SW62, SW63, SW64, TG62, TG63, and TG64 are maintained off. For example, the switch SW61 and the switch TG61 are turned on and the switches SW62, SW63, SW64, TG62, TG63, and TG64 are turned off when the image sensing pixel P61 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P61, the sensing line SL61, the current source CS61, the transistor M61, the switch SW61, and the current source CS62 shown in FIG. 6, which will therefore not be repeatedly described. Therefore, an output voltage Vout61 at the second terminal of the transistor M61 is a compensated voltage of the image sensing pixel P61. Based on this, the output voltage Vout61 has a linear relationship with a sensing voltage of the image sensing pixel P61.

During a period where the image sensing device reads out a sensing signal corresponding to the sensing line SL62, the switch SW62 and the switch TG62 are maintained on and the switches SW61, SW63, SW64, TG61, TG63, and TG64 are maintained off. For example, the switch SW62 and the switch TG62 are turned on and the switches SW61, SW63, SW64, TG61, TG63, and TG64 are turned off when the image sensing pixel P62 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P62, the sensing line SL62, the current source CS61, the transistor M61, the switch SW62, and the current source CS62 shown in FIG. 6, which will therefore not be repeatedly described. Therefore, the output voltage Vout61 at the second terminal of the transistor M61 is a compensated voltage of the image sensing pixel P62. Based on this, the output voltage Vout61 has a linear relationship with a sensing voltage of the image sensing pixel P62.

During a period where the image sensing device reads out a sensing signal corresponding to the sensing line SL63, the switch SW63 and the switch TG63 are maintained on and the switches SW61, SW62, SW64, TG61, TG62, and TG64 are maintained off. For example, the switch SW63 and the switch TG63 are turned on and the switches SW61, SW62, SW64, TG61, TG62, and TG64 are turned off when the image sensing pixel P63 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P63, the sensing line SL63, the current source CS61, the transistor M61, the switch SW63, and the current source CS62 shown in FIG. 6, which will therefore not be repeatedly described. Therefore, the output voltage Vout61 at the second terminal of the transistor M61 is a compensated voltage of the image sensing pixel P63. Based on this, the output voltage Vout61 has a linear relationship with a sensing voltage of the image sensing pixel P63.

During a period where the image sensing device reads out a sensing signal corresponding to the sensing line SL64, the switch SW64 and the switch TG64 are maintained on and the switches SW61, SW62, SW63, TG61, TG62, and TG63 are maintained off. For example, the switch SW64 and the switch TG64 are turned on and the switches SW61, SW62, SW63, TG61, TG62, and TG63 are turned off when the image sensing pixel P64 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P64, the sensing line SL64, the current source CS61, the transistor M61, the switch SW64, and the current source CS62 shown in FIG. 6, which will therefore not be repeatedly described. Therefore, the output voltage Vout61 at the second terminal of the transistor M61 is a compensated voltage of the image sensing pixel P64. Based on this, the output voltage Vout61 has a linear relationship with a sensing voltage of the image sensing pixel P64.

Depending on the actual design, in some embodiments, the image sensing pixel array 610 and the image readout circuit 620 shown in FIG. 6 may be implemented as the same IC, such as a CMOS image sensor (CIS). In other embodiments, the image sensing pixel array 610 and the image readout circuit 620 shown in FIG. 6 may be implemented as different elements. For example, the image sensing pixel array 610 may be implemented as a fingerprint image sensing panel integrated with a touch panel and/or a display panel and the image readout circuit 620 may be implemented as an image readout IC (e.g., an FTDI chip). Alternatively, in some embodiments, the image sensing pixel array 610, the transistor M61, the switch SW61, the switch SW62, the switch SW63, and the switch SW64 may be disposed in the same image sensing panel, and the current source CS61, the switch TG61, the switch TG62, the switch TG63, the switch TG64, and the current source CS62 may be disposed in the same image readout IC (e.g., an FTDI chip).

Figure 7:
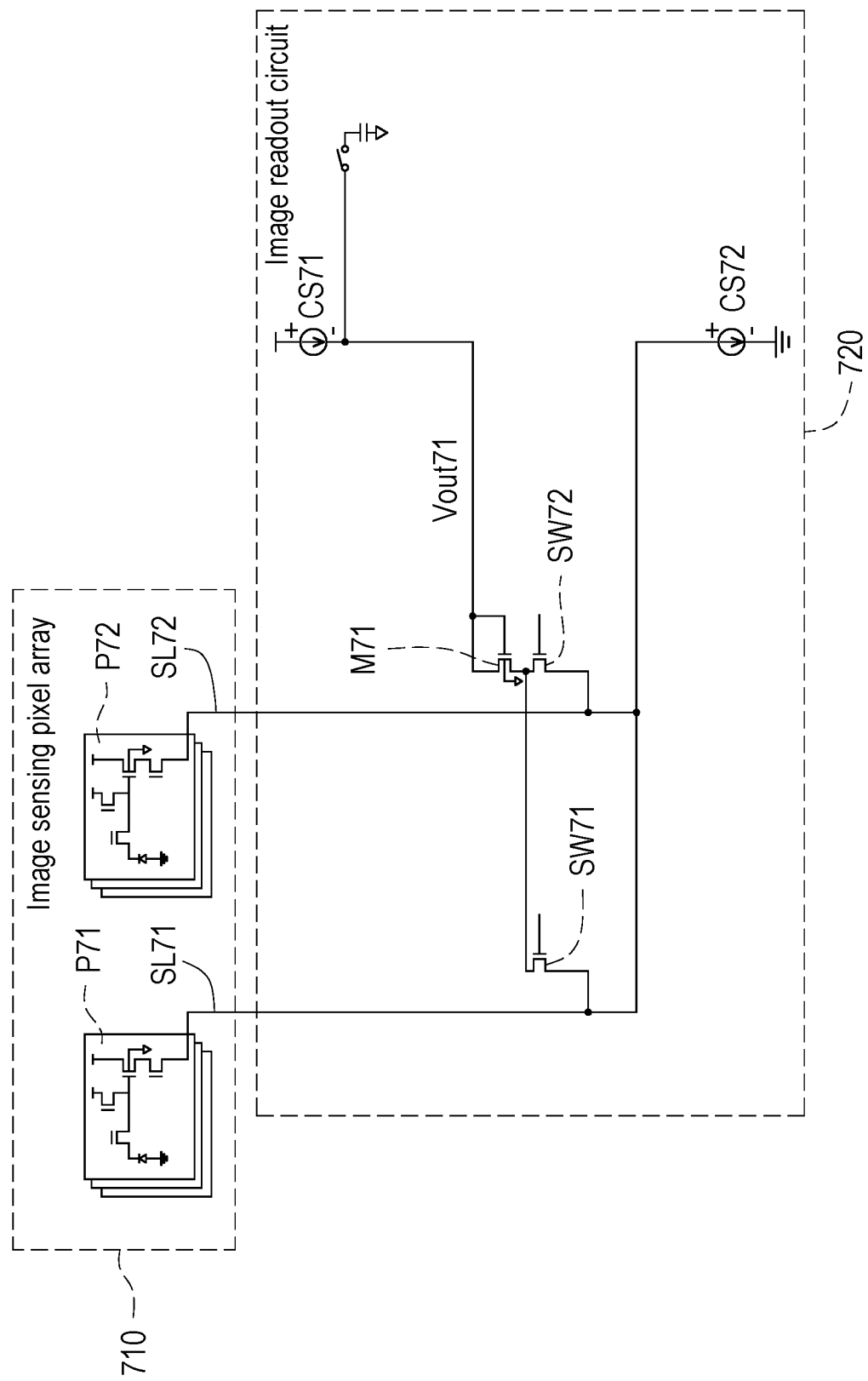
FIG. 7 is a schematic circuit block diagram of an image readout circuit according to another embodiment of the disclosure.

FIG. 7 is a schematic circuit block diagram of an image readout circuit 720 according to another embodiment of the disclosure. The image sensing pixel array 710 shown in FIG. 7 can be used as one of many examples of the image sensing pixel array 110 shown in FIG. 1. The image readout circuit 720 shown in FIG. 7 can be used as one of many examples of the image readout circuit 120 shown in FIG. 1. Reference may be made to the relevant description of the image readout circuit 120 shown in FIG. 1 for the image readout circuit 720 shown in FIG. 7. Reference may be made to the relevant description of the sensing lines SL11 to SL1n shown in FIG. 1 and the sensing line SL21 shown in FIG. 2 for sensing lines SL71 and SL72 shown in FIG. 7. Reference may be made to the relevant description of different columns of image sensing pixels in the image sensing pixel array 110 shown in FIG. 1 for each of image sensing pixels P71 and P72 shown in FIG. 7. For example (but not limited thereto), the sensing line SL71 is coupled to an odd-numbered sensing pixel column of the image sensing pixel array 710 and the sensing line SL72 is coupled to an even-numbered sensing pixel column of the image sensing pixel array 710. Reference may be made to the relevant description of the image sensing pixel P20 shown in FIG. 2 for analogy to the image sensing pixels P71 and P72 shown in FIG. 7, which will therefore not be repeatedly described.

In the embodiment shown in FIG. 7, the image readout circuit 720 (the image sensing device) includes a current source CS71, a transistor M71, a switch SW71, a switch SW72, and a current source CS72. The current source CS72 is coupled to the sensing line SL71 and the sensing line SL72. A first terminal of the switch SW71 is coupled to the sensing line SL71. A first terminal of the switch SW72 is coupled to the sensing line SL72. A first terminal (e.g., a source) of the transistor M71 is coupled to second terminals of the switches SW71 and SW72. A second terminal (e.g., a drain) and a control terminal (e.g., a gate) of the transistor M71 are coupled to the current source CS71.

During a period where the image sensing device reads out a sensing signal corresponding to the sensing line SL71, the switch SW71 is maintained on and the switch SW72 is maintained off. For example, the switch SW71 is turned on and the switch SW72 is turned off when the image sensing pixel P71 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P71, the sensing line SL71, the current source CS71, the transistor M71, the switch SW71, and the current source CS72 shown in FIG. 7, which will therefore not be repeatedly described. Therefore, an output voltage Vout71 at the second terminal of the transistor M71 is a compensated voltage of the image sensing pixel P71. Based on this, the output voltage Vout71 has a linear relationship with a sensing voltage of the image sensing pixel P71.

During a period where the image sensing device reads out a sensing signal corresponding to the sensing line SL72, the switch SW72 is maintained on and the switch SW71 is maintained off. For example, the switch SW71 is turned off and the switch SW72 is turned on when the image sensing pixel P72 is turned on. At this time, reference may be made to the relevant description of the image sensing pixel P20, the sensing line SL21, the current source CS22, the transistor M21, the switch SW21, and the current source CS21 shown in FIG. 2 for analogy to the image sensing pixel P72, the sensing line SL72, the current source CS71, the transistor M71, the switch SW72, and the current source CS72 shown in FIG. 7, which will therefore not be repeatedly described. Therefore, the output voltage Vout71 at the second terminal of the transistor M71 is a compensated voltage of the image sensing pixel P72. Based on this, the output voltage Vout71 has a linear relationship with a sensing voltage of the image sensing pixel P72.

Depending on the actual design, in some embodiments, the image sensing pixel array 710 and the image readout circuit 720 shown in FIG. 7 may be implemented as the same IC, such as a CMOS image sensor (CIS). In other embodiments, the image sensing pixel array 710 and the image readout circuit 720 shown in FIG. 7 may be implemented as different elements. For example, the image sensing pixel array 710 may be implemented as a fingerprint image sensing panel integrated with a touch panel and/or a display panel and the image readout circuit 720 may be implemented as an image readout IC (e.g., an FTDI chip). Alternatively, in some embodiments, the image sensing pixel array 710, the transistor M71, the switch SW71, and the switch SW72 may be disposed in the same image sensing panel, and the current source CS71 and the current source CS72 may be disposed in the same image readout IC (e.g., an FTDI chip).

Figure 8:
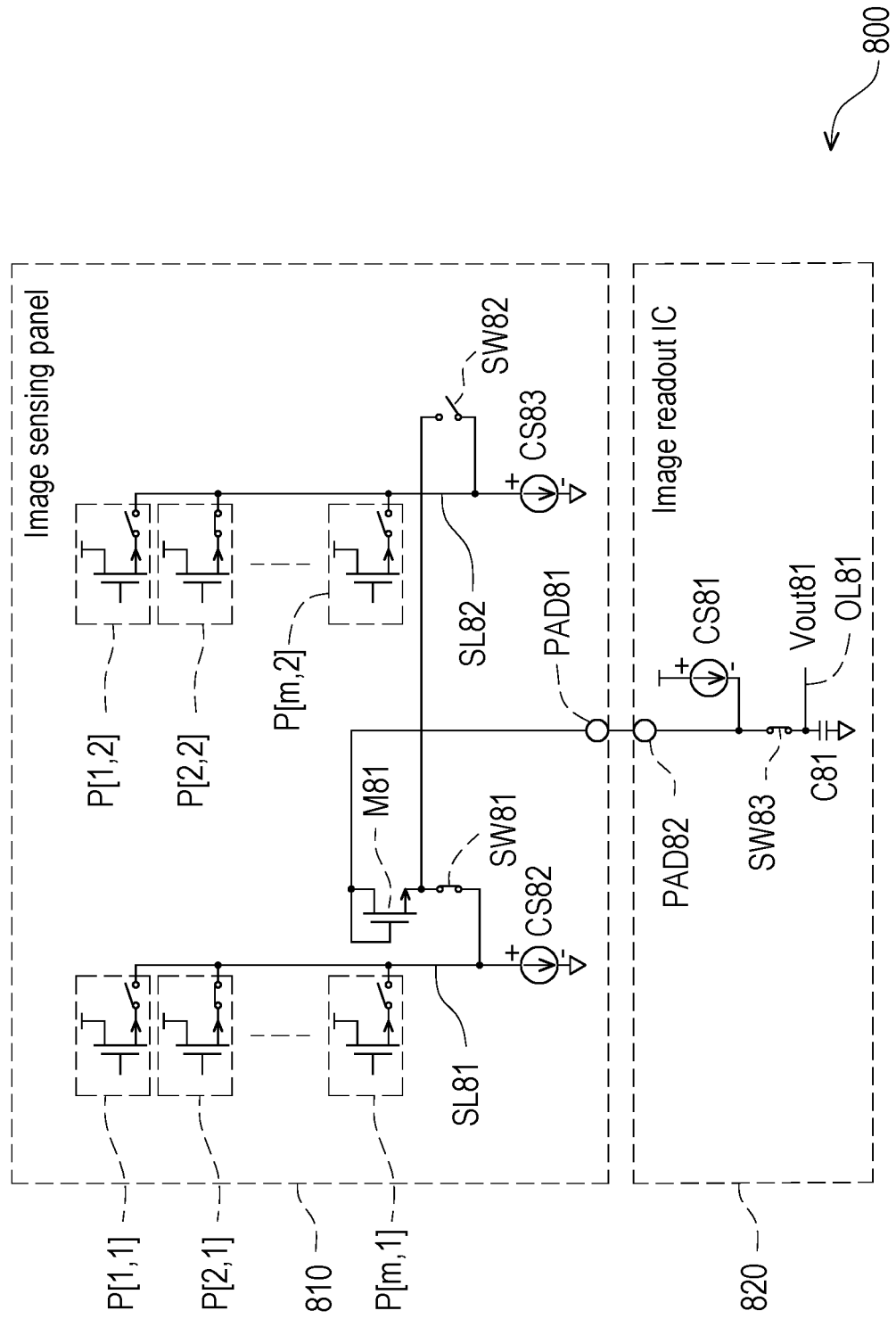
FIG. 8 is a schematic circuit block diagram of an image sensing device according to another embodiment of the disclosure.

FIG. 8 is a schematic circuit block diagram of an image sensing device 800 according to another embodiment of the disclosure. The image sensing device 800 shown in FIG. 8 includes an image sensing panel 810 and an image readout IC 820. The image sensing panel 810 includes an image sensing pixel array, and the image sensing pixel array includes a plurality of image sensing pixels, for example, image sensing pixels P[1,1], P[1,2], . . . , P[2,1], P[2,2], . . . , P[m,1], P[m,2], . . . shown in FIG. 8. The image sensing panel 810 further includes a plurality of sensing lines, for example, sensing lines SL81, SL82, . . . shown in FIG. 8. Reference may be made to the relevant description of the sensing lines SL11 to SL1n shown in FIG. 1 and the sensing line SL21 shown in FIG. 2 for the sensing lines SL81 and SL82 shown in FIG. 8. Reference may be made to the relevant description of different columns of image sensing pixels in the image sensing pixel array 110 shown in FIG. 1 for each of the image sensing pixels P[1,1], P[1,2], P[2,1], P[2,2], P[m,1], and P[m,2] shown in FIG. 8. For example (but not limited thereto), the sensing line SL81 is coupled to an odd-numbered sensing pixel column of the image sensing panel 810 and the sensing line SL82 is coupled to an even-numbered sensing pixel column of the image sensing panel 810. Reference may be made to the relevant description of the image sensing pixel P20 shown in FIG. 2 for analogy to any one of the image sensing pixels P[1,1], P[1,2], P[2,1], P[2,2], P[m,1], and P[m,2] shown in FIG. 8, which will therefore not be repeatedly described.

In the embodiment shown in FIG. 8, the image sensing panel 810 further includes a current source CS82, a current source CS83, a switch SW81, a switch SW82, and a transistor M81. The current source CS82 is coupled to the sensing line SL81. The current source CS83 is coupled to the sensing line SL82. The sensing line SL81 is coupled to one sensing pixel column of the image sensing pixel array and the sensing line SL82 is coupled to another sensing pixel column of the image sensing pixel array.

A first terminal of the switch SW81 is coupled to the sensing line SL81. A first terminal of the switch SW82 is coupled to the sensing line SL82. A second terminal of the switch SW81 and a second terminal of the switch SW82 are coupled to a first terminal (e.g., a source) of the transistor M81. In the embodiment shown in FIG. 8, a second terminal (e.g., a drain) and a control terminal (e.g., a gate) of the transistor M81 are coupled to a pad PAD81 of the image sensing panel 810.

Reference may be made to the relevant description of the current source CS21 shown in FIG. 2 for the current sources CS82 and CS83 shown in FIG. 8, reference may be made to the relevant description of the switch SW21 shown in FIG. 2 for the switch SW81 and SW82 shown in FIG. 8, and reference may be made to the relevant description of the transistor M21 shown in FIG. 2 for the transistor M81 shown in FIG. 8.

In the embodiment shown in FIG. 8, the image readout IC 820 includes a current source CS81, a switch SW83, a capacitor C81, and an output line OL81. A first terminal of the switch SW83 is coupled through a pad PAD82 of the image readout IC 820 and the pad PAD81 of the image sensing panel 810 to the second terminal and the control terminal of the transistor M81 of the image sensing panel 810. The current source CS81 is coupled to the first terminal of the switch SW83. A second terminal of the switch SW83 is coupled to output line output line OL81. A first terminal and a second terminal of the capacitor C81 are respectively coupled to the second terminal of the switch SW83 and a reference voltage (e.g., a ground voltage).

During a period where the image sensing device 800 reads out a sensing signal corresponding to the sensing line SL81, the switches SW81 and SW83 are maintained on and the switch SW82 is maintained off. For example, the switch SW81 is turned on and the switch SW82 is turned off when the image sensing pixel P[2,1] is turned on. When the image sensing pixel P[2,1] and the switch SW81 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P[2,1], the sensing line SL81, the current source CS81, the transistor M81, the switch SW81, and the current source CS82 shown in FIG. 8, which will therefore not be repeatedly described. At this time, an output voltage Vout81 at the output line OL81 is a compensated voltage of the image sensing pixel P[2,1]. Based on this, the output voltage Vout81 has a linear relationship with a sensing voltage of the image sensing pixel P[2,1].

On the contrary, during a period where the image sensing device 800 reads out a sensing signal corresponding to the sensing line SL82, the switch SW82 is maintained on and the switch SW81 is maintained off. For example, the switch SW81 is turned off and the switch SW82 is turned on when the image sensing pixel P[2,2] is turned on. When the image sensing pixel P[2,2] and the switch SW82 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P[2,2], the sensing line SL82, the current source CS81, the transistor M81, the switch SW82, and the current source CS83 shown in FIG. 8, which will therefore not be repeatedly described. At this time, the output voltage Vout81 at the output line OL81 is a compensated voltage of the image sensing pixel P[2,2]. Based on this, the output voltage Vout81 has a linear relationship with a sensing voltage of the image sensing pixel P[2,2].

Figure 9:
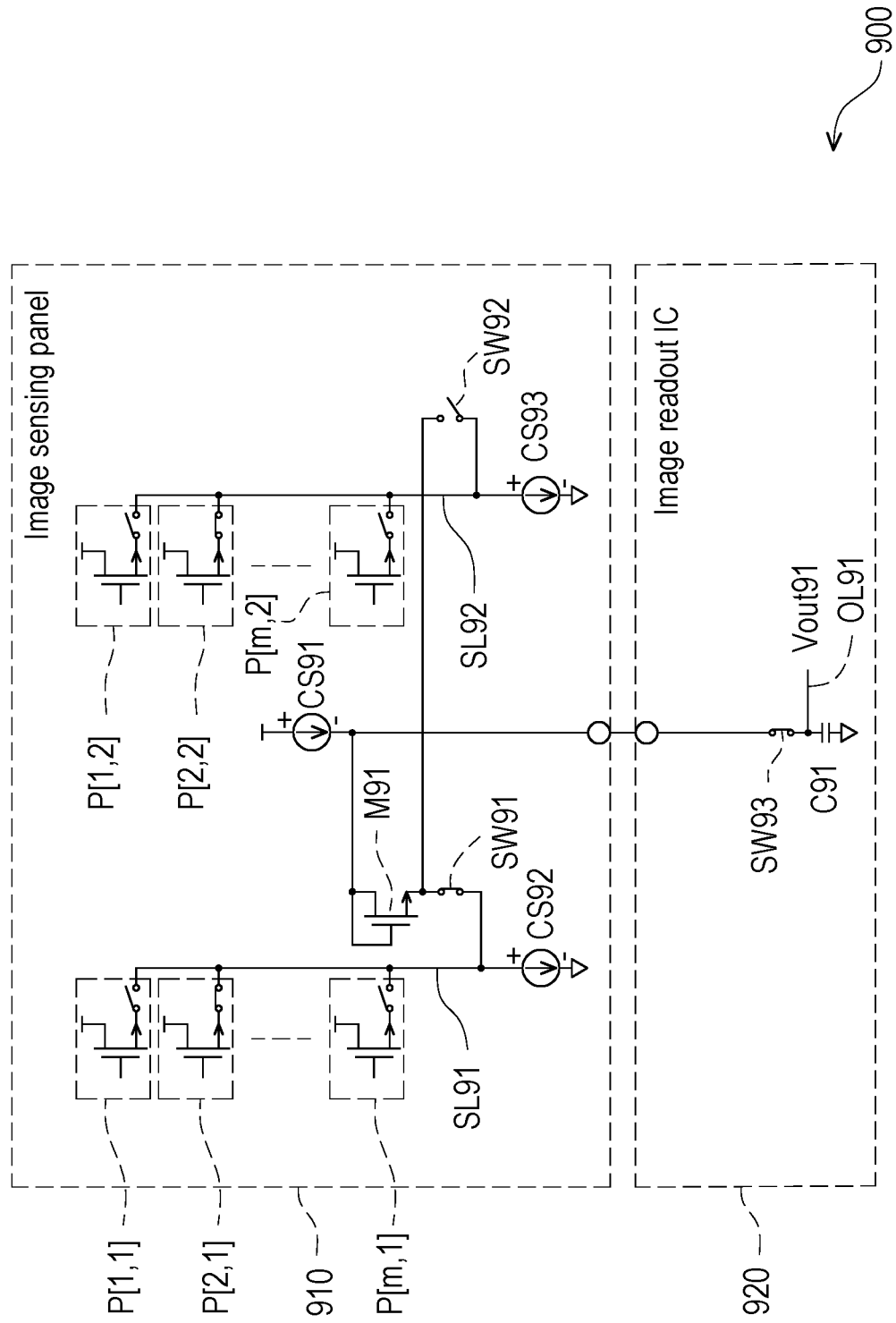
FIG. 9 is a schematic circuit block diagram of an image sensing device according to another embodiment of the disclosure.

FIG. 9 is a schematic circuit block diagram of an image sensing device 900 according to another embodiment of the disclosure. The image sensing device 900 shown in FIG. 9 includes an image sensing panel 910 and an image readout IC 920. The image sensing panel 910 includes an image sensing pixel array, and the image sensing pixel array includes a plurality of image sensing pixels, for example, the image sensing pixel P[1,1], P[1,2], . . . P[2,1], P[2,2], . . . , P[m,1], P[m,2], . . . shown in FIG. 9. The image sensing panel 910 further includes a plurality of sensing lines, for example, sensing lines SL91, SL92, . . . shown in FIG. 9. Reference may be made to the relevant description of the sensing lines SL11 to SL1n shown in FIG. 1 and the sensing line SL21 shown in FIG. 2 for the sensing lines SL91 and SL92 shown in FIG. 9. Reference may be made to the relevant description of the image sensing pixels P[1,1], P[1,2], P[2,1], P[2,2], P[m,1], and P[m,2] shown in FIG. 8 for analogy to the image sensing pixels P[1,1], P[1,2], P[2,1], P[2,2], P[m,1], and P[m,2] shown in FIG. 9, which will therefore not be repeatedly described.

In the embodiment shown in FIG. 9, the image sensing panel 910 further includes a current source CS91, a current source CS92, a current source CS93, a switch SW91, a switch SW92, and a transistor M91. The current source CS92 is coupled to the sensing line SL91. The current source CS93 is coupled to the sensing line SL92. The sensing line SL91 is coupled to one sensing pixel column of the image sensing pixel array and the sensing line SL92 is coupled to another sensing pixel column of the image sensing pixel array. Reference may be made to the relevant description of the current source CS82, the current source CS83, the switch SW81, the switch SW82, and the transistor M81 shown in FIG. 8 for analogy to the current source CS92, the current source CS93, the switch SW91, the switch SW92, and the transistor M91 shown in FIG. 9, which will therefore not be repeatedly described. The current source CS91 is coupled to a second terminal (e.g., a drain) and a control terminal (e.g., a gate) of the transistor M91.

In the embodiment shown in FIG. 9, the image readout IC 920 includes a switch SW93, a capacitor C91, and an output line OL91. Reference may be made to the relevant description of the switch SW83, the capacitor C81, and the output line OL81 shown in FIG. 8 for analogy to the switch SW93, the capacitor C91, and the output line output line OL91 shown in FIG. 9, which will therefore not be repeatedly described.

Figure 10:
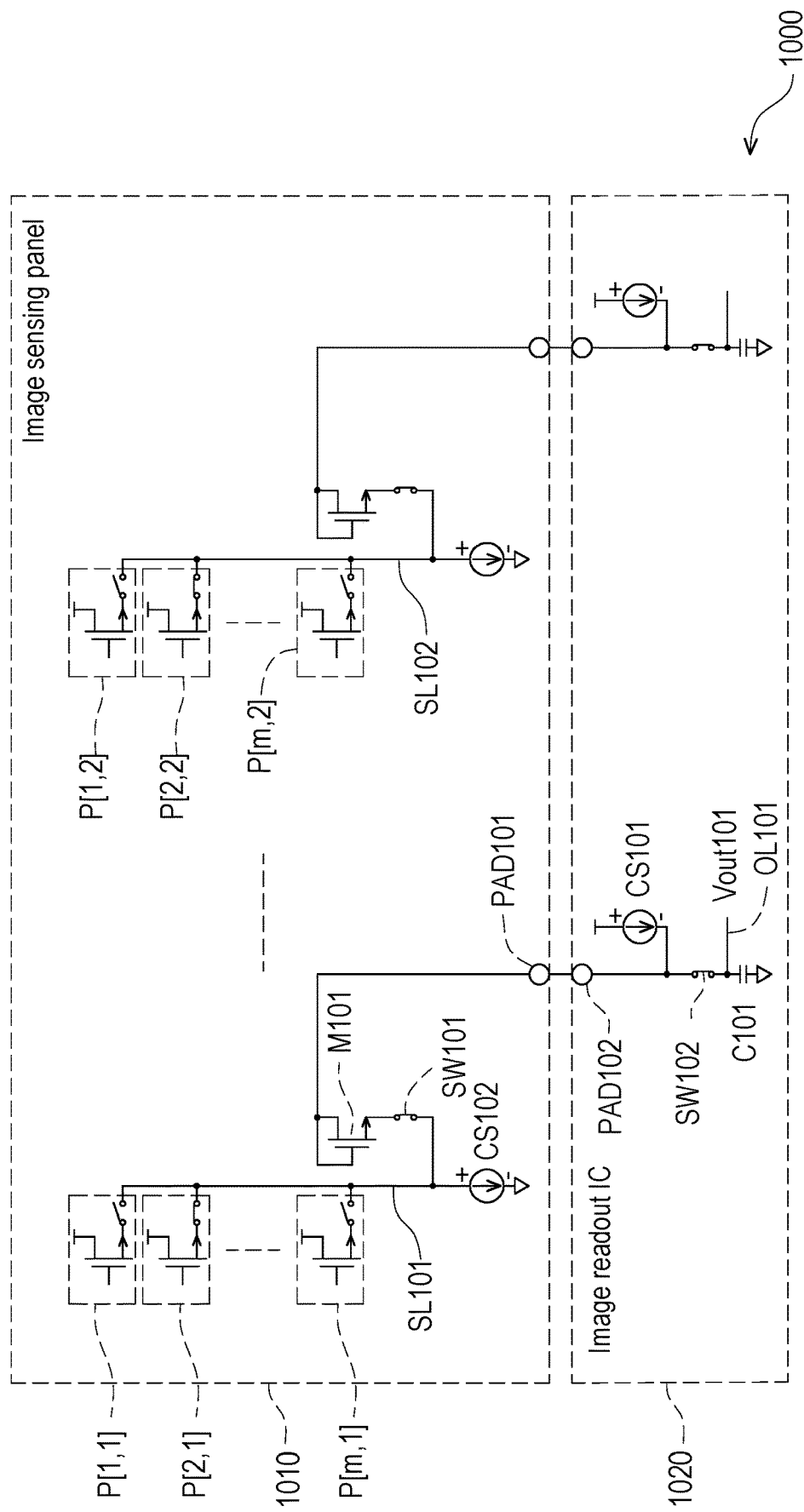
FIG. 10 is a schematic circuit block diagram of an image sensing device according to another embodiment of the disclosure.

FIG. 10 is a schematic circuit block diagram of an image sensing device 1000 according to another embodiment of the disclosure. The image sensing device 1000 shown in FIG. 10 includes an image sensing panel 1010 and an image readout IC 1020. The image sensing panel 1010 includes an image sensing pixel array, and the image sensing pixel array includes a plurality of image sensing pixels, for example, the image sensing pixel P[1,1], P[1,2], . . . , P[2,1], P[2,2], . . . , P[m,1], P[m,2], . . . shown in FIG. 10. The image sensing panel 1010 further includes a plurality of sensing lines, for example, sensing lines SL101, SL102, . . . shown in FIG. 10. Reference may be made to the relevant description of the sensing lines SL11 to SL1n shown in FIG. 1 and the sensing line SL21 shown in FIG. 2 for the sensing lines SL101 and SL102 shown in FIG. 10. Reference may be made to the relevant description of the image sensing pixels P[1,1], P[1,2], P[2,1], P[2,2], P[m,1], and P[m,2] shown in FIG. 8 for analogy to the image sensing pixels P[1,1], P[1,2], P[2,1], P[2,2], P[m,1], and P[m,2] shown in FIG. 10, which will therefore not be repeatedly described.

In the embodiment shown in FIG. 10, the image sensing panel 1010 further includes a current source CS102, a switch SW101, a transistor M101, and a pad PAD101. The current source CS102 is coupled to the sensing line SL101. The sensing line SL101 is coupled to one sensing pixel column of the image sensing pixel array. A first terminal of the switch SW101 is coupled to the sensing line SL101. A second terminal of the switch SW101 is coupled to a first terminal (e.g., a source) of the transistor M101. In the embodiment shown in FIG. 10, a second terminal (e.g., a drain) and a control terminal (e.g., a gate) of the transistor M101 are coupled to the pad PAD101 of the image sensing panel 1010.

Reference may be made to the relevant description of the current source CS21 shown in FIG. 2 for the current source CS102 shown in FIG. 10, reference may be made to the relevant description of the switch SW21 shown in FIG. 2 for the switch SW101 shown in FIG. 10, and reference may be made to the relevant description of the transistor M21 shown in FIG. 2 for the transistor M101 shown in FIG. 10.

In the embodiment shown in FIG. 10, the image readout IC 1020 includes a pad PAD102, a current source CS101, a switch SW102, a capacitor C101, and an output line OL101. The pad PAD102 is configured to be coupled to the pad PAD101 of the image sensing panel 1010. The current source CS101 is coupled to the pad PAD102. A first terminal of the switch SW102 is coupled through the pad PAD102 of the image readout IC 1020 and the pad PAD101 of the image sensing panel 1010 to the second terminal and the control terminal of the transistor M101 of the image sensing panel 1010. A second terminal of the switch SW102 is coupled to the output line OL101. A first terminal and a second terminal of the capacitor C101 are respectively coupled to the second terminal of the switch SW102 and a reference voltage (e.g., a ground voltage).

During a period where the image sensing device 1000 reads out a sensing signal corresponding to the sensing line SL101, the switches SW101 and SW102 are maintained on. For example, the switches SW101 and SW102 are turned on when the image sensing pixel P[2,1] is turned on. When the image sensing pixel P[2,1], the switch SW101, and the switch SW102 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P[2,1], the sensing line SL101, the current source CS101, the transistor M101, the switch SW101, and the current source CS102 shown in FIG. 10, which will therefore not be repeatedly described. At this time, an output voltage Vout101 at the output line OL101 is a compensated voltage of the image sensing pixel P[2,1]. Based on this, the output voltage Vout101 has a linear relationship with the sensing voltage of the image sensing pixel P[2,1].

Figure 11:
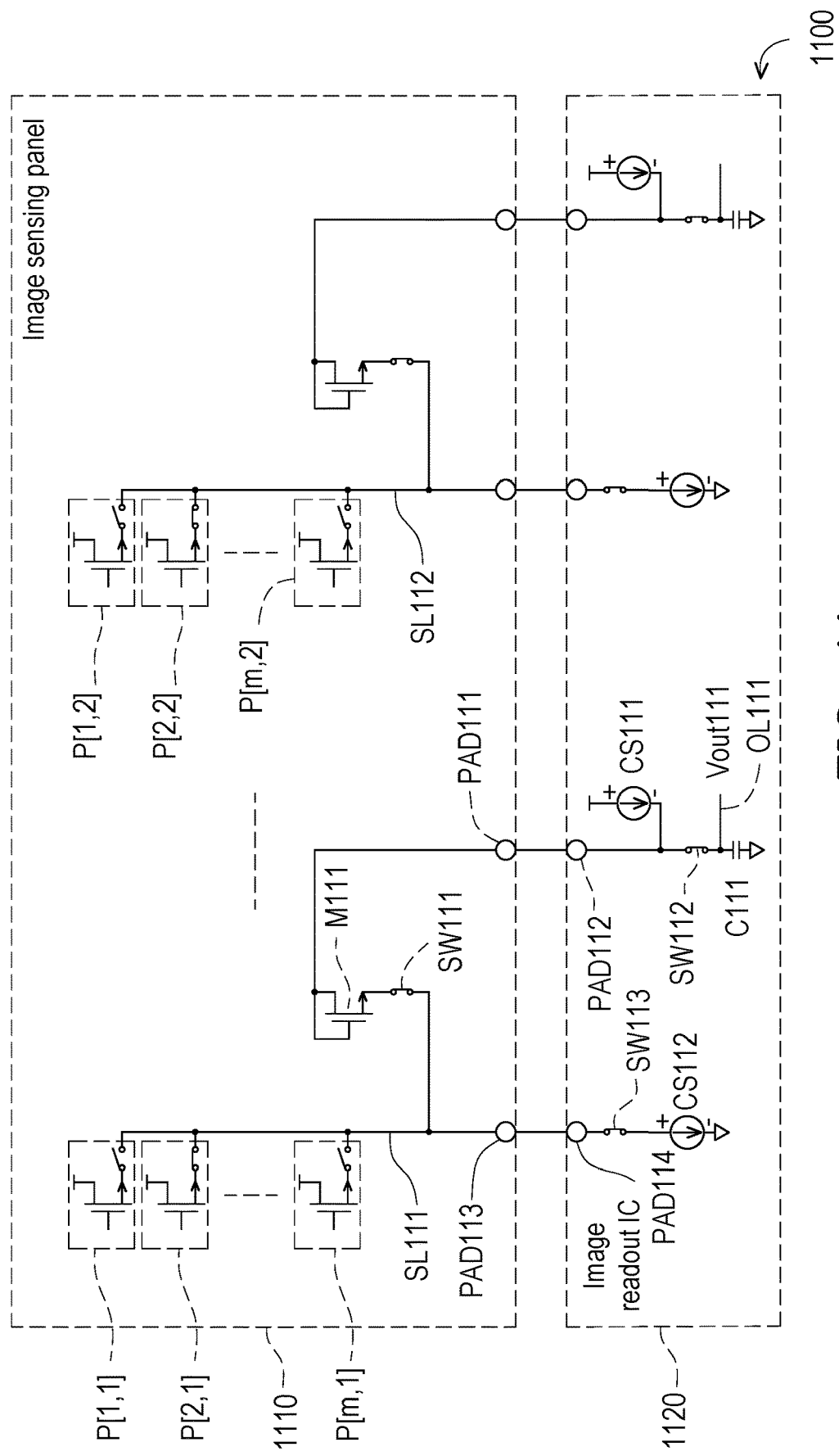
FIG. 11 is a schematic circuit block diagram of an image sensing device according to another embodiment of the disclosure.

FIG. 11 is a schematic circuit block diagram of an image sensing device 1100 according to another embodiment of the disclosure. The image sensing device 1100 shown in FIG. 11 includes an image sensing panel 1110 and an image readout IC 1120. The image sensing panel 1110 includes an image sensing pixel array, and the image sensing pixel array includes a plurality of image sensing pixels, for example, the image sensing pixel P[1,1], P[1,2], . . . , P[2,1], P[2,2], . . . , P[m,1], P[m,2], . . . shown in FIG. 11. The image sensing panel 1110 further includes a plurality of sensing lines, for example, sensing lines SL111, SL112, . . . shown in FIG. 11. Reference may be made to the relevant description of the sensing lines SL11 to SL1n shown in FIG. 1 and the sensing line SL21 shown in FIG. 2 for the sensing lines SL111 and SL112 shown in FIG. 11. Reference may be made to the relevant description of the image sensing pixels P[1,1], P[1,2], P[2,1], P[2,2], P[m,1], and P[m,2] shown in FIG. 8 for analogy to the image sensing pixels P[1,1], P[1,2], P[2,1], P[2,2], P[m,1], and P[m,2] shown in FIG. 11, which will therefore not be repeatedly described.

In the embodiment shown in FIG. 11, the image sensing panel 1110 further includes a pad PAD111, a pad PAD113, a switch SW111, and a transistor M111. The pad PAD111 is coupled to the sensing line SL111, and the sensing line SL111 is coupled to one sensing pixel column of the image sensing pixel array. Reference may be made to the relevant description of the switch SW101 and the transistor M101 shown in FIG. 10 for analogy to the switch SW111 and the transistor M111 shown in FIG. 11, which will therefore not be repeatedly described.

In the embodiment shown in FIG. 11, with respect to each sensing channel, the image readout IC 1120 includes a pad PAD112, a pad PAD114, a current source CS111, a current source CS112, a switch SW112, a capacitor C111, and an output line OL111. The pad PAD112 is configured to be coupled to the pad PAD111 of the image sensing panel 1110, and the pad PAD114 is configured to be coupled to the pad PAD113 of the image sensing panel 1110. The current source CS111 is coupled to the pad PAD112. A first terminal of the switch SW112 is coupled through the pad PAD112 of the image readout IC 1120 and the pad PAD111 of the image sensing panel 1110 to a second terminal and a control terminal of the transistor M111 of the image sensing panel 1110. A second terminal of the switch SW112 is coupled to the output line OL111. A first terminal and a second terminal of the capacitor C111 are respectively coupled to the second terminal of the switch SW112 and a reference voltage (e.g., a ground voltage). A first terminal of a switch SW113 is coupled to the current source CS111. The pad PAD114 is coupled to a second terminal of the switch SW113.

During a period where the image sensing device 1100 reads out a sensing signal corresponding to the sensing line SL111, the switches SW111, SW112, and SW113 are maintained on. For example, the switches SW111, SW112, and SW113 are turned on when the image sensing pixel P[2,1] is turned on. When the image sensing pixel P[2,1], the switch SW111, the switch SW112, and the switch SW113 are turned on, reference may be made to the relevant description of the image sensing pixel P20, the sensing line SL21, the current source CS22, the transistor M21, the switch SW21, and the current source CS21 shown in FIG. 2 for analogy to the image sensing pixel P[2,1], the sensing line SL111, the current source CS111, the transistor M111, the switch SW111, and the current source CS112 shown in FIG. 11, which will therefore not be repeatedly described. At this time, an output voltage Vout111 at the output line OL111 is a compensated voltage of the image sensing pixel P[2,1]. Based on this, the output voltage Vout111 has a linear relationship with the sensing voltage of the image sensing pixel P[2,1].

In summary of the foregoing, the image sensing device 1100 of the embodiment above utilizes the transistor M111 and the switch SW111 to compensate for nonlinearity and a voltage drop generated by the source follower and the sensing line switch in the image sensing pixel. Therefore, the voltage (the output voltage Vout111) at the control terminal of the transistor M111 may follow the light sensing result of the light sensing element in the image sensing pixel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image sensing device, for sensing an image sensing pixel array through a plurality of sensing lines, the image sensing device comprising:
   a first switch, having a first terminal configured to be coupled to a first sensing line among the sensing lines;
   a second switch, having a first terminal configured to be coupled to a second sensing line among the sensing lines;
   a transistor, having a first terminal coupled to a second terminal of the first switch and a second terminal of the second switch; and
   a first current source, coupled to a second terminal of the transistor.

2. The image sensing device according to claim 1, wherein a control terminal of the transistor is coupled to the second terminal of the transistor.

3. The image sensing device according to claim 1, further comprising:
   a second current source, configured to be coupled to the first sensing line; and
   a third current source, configured to be coupled to the second sensing line.

4. The image sensing device according to claim 1, further comprising:
   a third switch, having a first terminal configured to be coupled to the first sensing line;
   a fourth switch, having a first terminal configured to be coupled to the second sensing line; and
   a second current source, coupled to a second terminal of the third switch and a second terminal of the fourth switch.

5. The image sensing device according to claim 4, further comprising:
   a fifth switch, having a first terminal configured to be coupled to a third sensing line among the sensing lines, wherein a second terminal of the fifth switch is coupled to the first terminal of the transistor;
   a sixth switch, having a first terminal configured to be coupled to a fourth sensing line among the sensing lines, wherein a second terminal of the sixth switch is coupled to the first terminal of the transistor;
   a seventh switch, having a first terminal configured to be coupled to the third sensing line and a second terminal coupled to the second current source; and
   an eighth switch, having a first terminal configured to be coupled to the fourth sensing line and a second terminal coupled to the second current source.

6. The image sensing device according to claim 1, further comprising:
   a second current source, configured to be coupled to the first sensing line and the second sensing line.

7. The image sensing device according to claim 1, wherein the first switch is maintained on and the second switch is maintained off during a period where the image sensing device reads out a sensing signal corresponding to the first sensing line, and the second switch is maintained on and the first switch is maintained off during a period where the image sensing device reads out a sensing signal corresponding to the second sensing line.

8. The image sensing device according to claim 1, wherein the first sensing line is coupled to an odd-numbered sensing pixel column of the image sensing pixel array and the second sensing line is coupled to an even-numbered sensing pixel column of the image sensing pixel array.

9. An image sensing device comprising:
   an image sensing panel, having a first sensing line, a second sensing line, an image sensing pixel array, a first switch, a second switch, and a transistor, wherein the first sensing line is coupled to a first sensing pixel column of the image sensing pixel array, the second sensing line is coupled to a second sensing pixel column of the image sensing pixel array, a first terminal of the first switch is coupled to the first sensing line, a first terminal of the second switch is coupled to the second sensing line, and a second terminal of the first switch and a second terminal of the second switch are coupled to a first terminal of the transistor; and an image readout integrated circuit, having a third switch and an output line, wherein a first terminal of the third switch is coupled to a second terminal and a control terminal of the transistor of the image sensing panel, and a second terminal of the third switch is coupled to the output line.

10. The image sensing device according to claim 9, wherein the image sensing panel further comprises:

a first current source, coupled to the first sensing line; and a second current source, coupled to the second sensing line.

11. The image sensing device according to claim 9, wherein the image readout integrated circuit further comprises:

a capacitor, having a first terminal and a second terminal respectively coupled to the second terminal of the third switch and a reference voltage; and a current source, coupled to the first terminal of the third switch.

12. The image sensing device according to claim 9, wherein the image sensing panel further comprises:

a current source, coupled to the second terminal and the control terminal of the transistor.

13. The image sensing device according to claim 9, wherein the image readout integrated circuit further comprises:

a fourth switch, having a first terminal configured to be coupled to the first sensing line of the image sensing panel;

a fifth switch, having a first terminal configured to be coupled to the second sensing line of the image sensing panel; and a current source, coupled to a second terminal of the fourth switch and a second terminal of the fifth switch.

14. The image sensing device according to claim 13, wherein the image sensing panel further comprises a sixth switch and a seventh switch, a first terminal of the sixth switch is coupled to a third sensing line of the image sensing panel, a second terminal of the sixth switch is coupled to the first terminal of the transistor, a first terminal of the seventh switch is coupled to a fourth sensing line of the image sensing panel, and a second terminal of the seventh switch coupled to the first terminal of the transistor; and the image readout integrated circuit further comprises an eighth switch and a ninth switch, a first terminal of the eighth switch is coupled to the third sensing line of the image sensing panel, a second terminal of the eighth switch is coupled to the current source, a first terminal of the ninth switch is coupled to the fourth sensing line of the image sensing panel, and a second terminal of the ninth switch is coupled to the current source.

15. The image sensing device according to claim 9, wherein the image readout integrated circuit further comprises:

a current source, configured to be coupled to the first sensing line and the second sensing line of the image sensing panel.

16. The image sensing device according to claim 9, wherein the first switch is maintained on and the second switch is maintained off during a period where the image readout integrated circuit reads out a sensing signal corresponding to the first sensing line, and the second switch is maintained on and the first switch is maintained off during a period where the image readout integrated circuit reads out a sensing signal corresponding to the second sensing line.

17. The image sensing device according to claim 9, wherein the first sensing line is coupled to an odd-numbered sensing pixel column of the image sensing pixel array and the second sensing line is coupled to an even-numbered sensing pixel column of the image sensing pixel array.

18. An image sensing device comprising:

an image sensing panel, having an image sensing pixel array, a sensing line, a first switch, a transistor, and a first pad, wherein the sensing line is coupled to a sensing pixel column of the image sensing pixel array, the sensing line is adapted to be coupled to a first current source, a first terminal of the first switch is coupled to the sensing line, a second terminal of the first switch is coupled to a first terminal of the transistor, and a second terminal and a control terminal of the transistor are coupled to the first pad; and an image readout integrated circuit, having a second pad and a second current source, wherein the second pad is configured to be coupled to the first pad, and the second current source is coupled to the second pad.

19. The image sensing device according to claim 18, wherein the first current source is disposed at the image sensing panel.

20. The image sensing device according to claim 18, wherein the image sensing panel further comprises a third pad, the third pad is coupled to the sensing line, and the image readout integrated circuit further comprises:

the first current source;

a second switch, having a first terminal coupled to the first current source; and a fourth pad, configured to be coupled to the third pad, wherein the fourth pad is coupled to a second terminal of the second switch.

21. The image sensing device according to claim 18, wherein the image readout integrated circuit further comprises:

a second switch, having a first terminal coupled to the second pad;

a capacitor, having a first terminal and a second terminal respectively coupled to a second terminal of the second switch and a reference voltage; and an output line, coupled to the second terminal of the second switch.

* * * * *